M. KOHLER.
PICKER STAFF CONNECTION FOR LOOMS.
APPLICATION FILED SEPT. 23, 1916. RENEWED JUNE 1, 1918.
1,288,926. Patented Dec. 24, 1918.
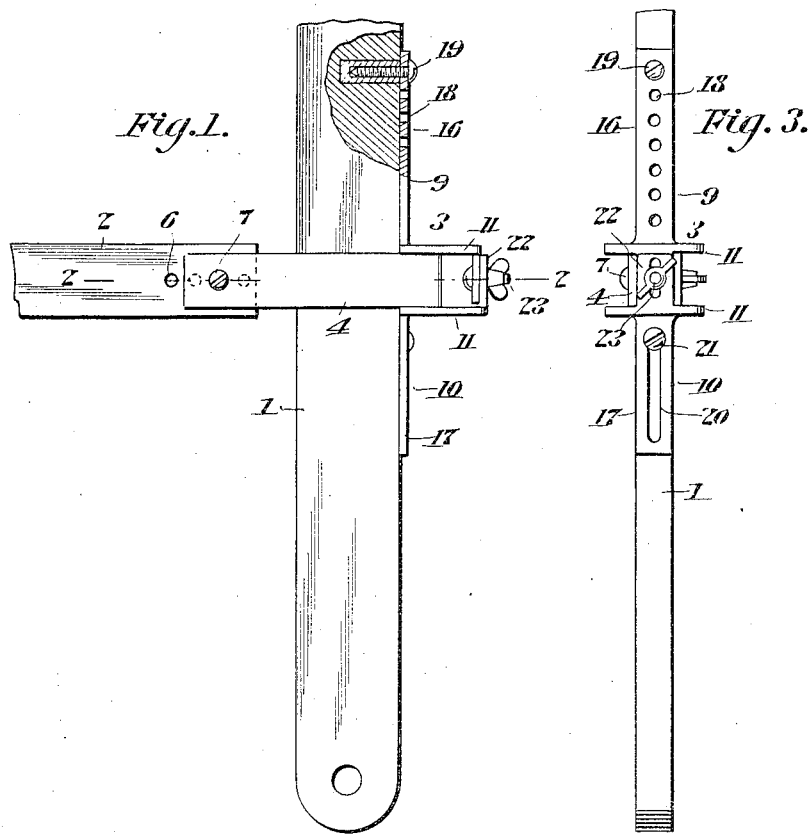
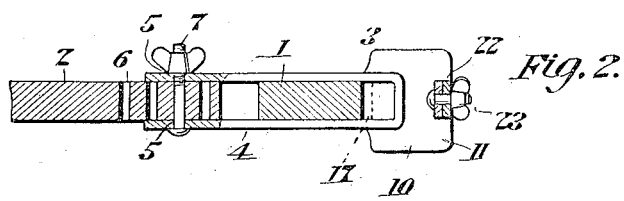
Inventor
Magnus Kohler
By Victor J. Evans
Attorney
Witnesses

UNITED STATES PATENT OFFICE.

MAGNUS KOHLER, OF PHILADELPHIA, PENNSYLVANIA, ASSIGNOR OF ONE-FOURTH TO FRANCES KOHLER, OF PHILADELPHIA, PENNSYLVANIA.

PICKER-STAFF CONNECTION FOR LOOMS.

1,288,926.  Specification of Letters Patent.  Patented Dec. 24, 1918.

Application filed September 23, 1916, Serial No. 121,753. Renewed June 1, 1918. Serial No. 237,818.

*To all whom it may concern:*

Be it known that I, MAGNUS KOHLER, a citizen of the United States, residing at Philadelphia, in the county of Philadelphia and State of Pennsylvania, have invented new and useful Improvements in Picker-Staff Connections for Looms, of which the following is a specification.

This invention relates to looms, and has particular reference to improved mechanism operable for connecting the picker staff of a loom to its actuating arm.

An object of the invention is to provide an improved connection of the above character, wherein means are provided for regulating the extent of movement of the picker staff.

Another object resides in novel connecting mechanism for associating the lug strap of a picker staff actuating arm with the picker staff, said mechanism embodying an adjustable bracket secured upon one edge of the picker staff and having means for regulating its position upon the latter, so that the length of movement or throw of the picker staff will be readily governed.

A further object includes a bracket for guiding the movement of the lug strap and actuating picker staff, whereby the intermittent and jerky movement of the actuating arm will be imparted to the picker staff in a smooth and easy manner and whereby the lug strap is prevented from jumping or having other unnecessary movement.

Further objects will be in part obvious and in part pointed out hereinafter.

The invention accordingly consists in the features of construction, combinations of elements and arrangement of parts which will be exemplified in the construction herein described and the scope of the application of which will be indicated in the appended claims.

In the drawings,

Figure 1 is a side elevation of the picker staff and its actuating arm, illustrating the application of a bracket comprising the present invention thereto, Fig. 2 is a horizontal sectional view taken on the line 2—2 of Fig. 1, and Fig. 3 is an edge view of the picker staff and its associated elements.

Similar characters of reference denote corresponding parts throughout the several views of the drawing.

Referring more particularly to the preferred form of the invention, the numeral 1 designates a picker staff of the usual construction, and in view of the fact that the operation of the same is well understood by those versed in the art, detailed description of its operation will be accordingly omitted. However, the picker staff is operated as usual by an actuating arm 2, and the movement of the reciprocating arm 2 is imparted to the picker staff through connecting mechanism 3, embodying the present invention.

The mechanism 3 preferably consists of a leather lug strap 4 of U-shaped formation. The free ends of the strap are provided with alining apertures 5, which register with one of a plurality of similar openings 6, formed in one extremity of the actuating arm 2. A bolt or other fastening element 7 passes through the openings 5 and 6 in order that the strap 4 may be secured to the actuating arm, the plurality of openings 6 permitting the strap 4 to be adjusted to different positions on the actuating arm, in order to govern its period of operation.

The lug strap encircles the picker staff 1, as shown in Fig. 2, in order that the movement of the actuating arm will be directly imparted to the picker staff. In view of the fact that the picker staff is oscillated with the view of controlling the operation of the shuttle (not shown), I have provided an improved bracket for regulating the extent of movement of the picker staff, so that its operation upon the shuttle may be accordingly governed, as will be readily understood by those versed in the art. The bracket above referred to consists of a plurality of coöperating sections 9 and 10, which are adapted to surround one extremity of the lug strap and to regulate the action of the latter upon the picker staff. Each section preferably includes a one piece structure formed from cast or stamped metal. The sections are provided with strap bearing plates 11, arranged to contact with the upper and lower edges of the lug strap 4.

The plates 11 terminate in vertically extending securing lugs 16 and 17, the lug 16 being formed with a plurality of alining openings 18 for the reception of a threaded securing element 19, connected with the picker staff 1. The lower lug 17 is substantially similar in construction to the lug 16 with the exception of being formed with an elongated slot 20 in place of the openings 18, said slot receiving a securing element 21 connected with the picker staff 1. It will be seen that by loosening the securing elements 19 and 21 the positions of the sections 9 and 10 may be altered, vertically, upon the picker staff 1. It will thus be seen that the raising or lowering of the lug strap 4 upon the picker staff will govern, to different degrees, the extent of movement of the latter, so that its operation upon the shuttle may be readily controlled.

In certain instances the bracket may be formed from one piece of material, however, in the form illustrated, the same consists of the two sections 9 and 10, the latter being adjustably connected through the provision of overlapping slotted extremities 22, through which a securing element 23 passes, to bind the two sections together at this point. By this construction the plates 11 are capable of relative adjustment in order to accommodate lug straps of different dimensions.

It will thus be seen that there is provided a simple and effective connecting mechanism for the above purpose the same being composed of but few parts and are of durable construction. Several changes of relation may be accomplished with a minimum of time and labor, and when the parts are once set, the mechanism is of such character as to insure against slipping, thus rendering the device thoroughly reliable in operation.

Having thus described the invention, what is claimed as new and patentable is:—

1. In combination, a picker staff and actuating arm therefor, a lug strap looped about said picker staff and having its extremities secured to one end of said actuating arm, bracket elements formed to unitedly define with the picker staff a closed loop for the reception of and inclosing said strap, said bracket elements being adjustable toward and away from each other longitudinally of the picker staff as a unit for varying the position of the strap upon said staff.

2. In combination, a picker staff and actuating arm therefor, a lug strap embracing said staff and having its terminals secured to one end of said actuating arm, a pair of bracket elements secured to said staff, spaced parallel flanges forming part of said bracket elements and adapted to receive the strap therebetween, said bracket elements being adjustable longitudinally of the picker staff and also relative to each other for receiving straps of varying widths, and overlapping extensions projecting at right angles from said flanges for inclosing the strap in the space between said flanges.

In testimony whereof I affix my signature.

MAGNUS KOHLER.